(12) United States Patent
Huang et al.

(10) Patent No.: US 8,587,726 B2
(45) Date of Patent: Nov. 19, 2013

(54) SYSTEM AND PROCESS FOR IMAGE RESCALING USING ADAPTIVE INTERPOLATION KERNEL WITH SHARPNESS AND OVERSHOOT CONTROL

(75) Inventors: Yong Huang, Singapore (SG); Lucas Hui, Singapore (SG); Haiyun Wang, Singapore (SG); Fritz Lebowsky, St. Martin d'Uriage (FR)

(73) Assignees: STMicroelectronics Asia Pacific Pte., Ltd., Singapore (SG); STMicroelectronics SA, Montrouge (FR)

( * ) Notice: Subject to any disclaimer, the term of this patent is extended or adjusted under 35 U.S.C. 154(b) by 434 days.

(21) Appl. No.: 12/655,254

(22) Filed: Dec. 23, 2009

(65) Prior Publication Data
US 2010/0165204 A1    Jul. 1, 2010

(30) Foreign Application Priority Data
Dec. 31, 2008    (SG) ................. 200809685-1

(51) Int. Cl.
*H04N 9/74*    (2006.01)

(52) U.S. Cl.
USPC ........... 348/581; 348/576; 348/578; 348/580; 348/625

(58) Field of Classification Search
USPC ......... 348/450, 452, 571, 580, 581, 576, 578, 348/606, 607; 382/266
See application file for complete search history.

(56) References Cited

U.S. PATENT DOCUMENTS

| | | | | |
|---|---|---|---|---|
| 5,327,257 A * | 7/1994 | Hrytzak et al. | ............... | 358/447 |
| 6,714,688 B1 * | 3/2004 | Gallagher et al. | ............ | 382/266 |
| 6,801,339 B1 * | 10/2004 | Ito | ................ | 358/3.26 |
| 6,965,395 B1 * | 11/2005 | Neter | ............ | 348/129 |
| 7,151,863 B1 * | 12/2006 | Bradley et al. | ............... | 382/299 |
| 7,319,494 B2 * | 1/2008 | Wredenhagen et al. | ...... | 348/606 |
| 7,733,419 B1 * | 6/2010 | Lew et al. | ..................... | 348/441 |
| 7,782,401 B1 * | 8/2010 | Chou | ............ | 348/581 |
| 7,847,863 B2 * | 12/2010 | Ali | ............... | 348/625 |
| 7,876,378 B1 * | 1/2011 | Lew et al. | ................. | 348/420.1 |
| 7,936,942 B2 * | 5/2011 | Aoyama et al. | ............... | 382/269 |
| 8,310,592 B2 * | 11/2012 | Wada | ............ | 348/448 |
| 8,369,652 B1 * | 2/2013 | Khosla et al. | ................ | 382/284 |
| 2006/0192897 A1 * | 8/2006 | Morphet | ................ | 348/625 |
| 2010/0128168 A1 * | 5/2010 | Zhen et al. | ................ | 348/420.1 |

* cited by examiner

*Primary Examiner* — Jefferey Harold
*Assistant Examiner* — Humam Satti
(74) *Attorney, Agent, or Firm* — Munck Wilson Mandala, LLP

(57) ABSTRACT

Provided are a digital video rescaling system, a method of rescaling video images, and a chip comprising a computer executable medium embedded therein computer executable instructions for rescaling video images.

20 Claims, 7 Drawing Sheets

| DOWNSCALING FACTORS | 1D 7-TAP LOWPASS FILTER COEFFICIENTS $h(n), n = 0 \ldots 6.$ $y(n) = \sum_{i=n-3}^{n+3} h(i) * Yin(i)$ |
|---|---|
| 0.20x - 0.29x | 2, 18, 63, 90, 63, 18, 2 |
| 0.30x - 0.39x | 0, 12, 65, 102, 65, 12, 0 |
| 0.40x - 0.49x | -2, 4, 65, 122, 65, 4, -2 |
| 0.50x - 0.59x | -2, -4, 63, 142, 63, -4, -2 |
| 0.60x - 0.69x | 0, -10, 56, 164, 56, -10, 0 |
| 0.70x - 0.79x | 2, -13, 44, 190, 44, -13, 2 |
| 0.80x - 0.89x | 2, -10, 28, 216, 28, -10, 2 |
| 0.90x - 0.99x | 1, -4, 10, 242, 10, -4, 1 |

SYSTEM AND PROCESS FOR IMAGE RESCALING USING ADAPTIVE INTERPOLATION KERNEL WITH SHARPNESS AND OVERSHOOT CONTROL

CROSS-REFERENCE TO RELATED APPLICATION(S) AND CLAIM OF PRIORITY

This application claims the benefit under 35 U.S.C. §119(a) to a Singapore patent application filed in the Intellectual Property Office of Singapore on Dec. 31, 2008 and assigned Serial No. 200809685-1, the entire disclosure of which is hereby incorporated by reference.

TECHNICAL FIELD OF THE INVENTION

The present invention generally relates to the field of digital image processing, and more particularly to a system and process for rescaling digital images using adaptive interpolation kernel with sharpness and overshoot control.

BACKGROUND OF THE INVENTION

Digital images have become more popular in the field of image display because they offer clarity and less distortion during processing. Furthermore, a wider range of image processing algorithms can be applied to digital images. Interpolation is a common stage in image processing to improve the appearance of the processed image on the output imaging medium. Interpolation is often performed during rescaling or resizing of digital images.

Rescaling or resizing of digital images includes magnification or reduction of image. For example, large screen displays have a native resolution that reaches or exceeds the well-known high-definition TV (HDTV) standard. In order to display a low-resolution digital image on a large screen display, it is desirable to rescale the image to a full screen resolution.

Traditionally, linear interpolation techniques such as bilinear or bicubic interpolation are used to rescale digital images. However, these linear interpolation techniques have certain drawbacks. For example, the interpolated image may suffer from blurred edges, resulting in a loss in image quality. Furthermore, artifacts such as overshoot and undershoot may be introduced around the edge areas. Therefore, many techniques have been proposed to improve the subjective quality of the interpolated images by using adaptive (interpolation) algorithms. These adaptive algorithms minimize loss in image quality by adapting the interpolation coefficients in the algorithms to better match the local structures around the edges of the image.

One approach/method for adaptive interpolation of image data is by selecting an appropriate interpolation kernel function from a plurality of different interpolation kernel functions based on one or more factors. The factors can be the input image format, the output imaging media, or the appearance characteristic of the interpolated image data.

Another approach/method (to provide a representation of image data) is by using a scaled kernel. The scaled kernel is constructed by transforming a kernel from a first range to a second range, where the second range is smaller than the first range. This method can improve the sharpness of the image data without any overshoot problem. However, transforming a kernel from one range to another range creates a dead-zone in the transformed range, which may result in an un-natural edge effect in the interpolated image.

Yet another approach/method (for digital image interpolation and sharpness enhancement) is by combining two interpolated images with sharpness level control. The two interpolated images are generated by two interpolation filters with different cut-off frequencies. This method will lead to overshoot and undershoot artifacts near the edge areas when using large sharpness control parameters.

Generally, the three methods as discussed above address the issues of loss in image quality by applying effective global sharpness control. In global sharpness control, the control parameter is fixed for all the pixels. However, the effect of local sharpness control for different characteristics of the image content has not been adequately addressed. For example, while the three methods enhance the sharpness of the edge components, they also tend to amplify the noise in the signal. Furthermore, the three methods are unable to control the sharpness level locally through local sharpness control, thereby causing the weak edges to be enhanced without over-enhancing the strong edges. In local sharpness control, the control parameter is different for each individual pixel. As a result, the methods produce artificial-looking images.

One approach for local sharpness control is to apply an adaptive enhancement process on different edge magnitudes to achieve good edge enhancement. However, the soft edges can add depth perceptibility to the digital image, and therefore this approach is not suitable for steepening. Furthermore, the hard edges are already steep enough to demand further enhancement.

As described above, conventional linear interpolation techniques and the existing adaptive techniques suffer from blurred edges or artifacts introduced around edge areas, such as overshoot and undershoot. The conventional techniques generally address the effectiveness of global sharpness control which is based only on different formats of input image data or different types of the output display media. They are not concerned about the local image content. Hence, they are noise sensitive.

In the case of downscaling, a number of input pixels in the original image are transformed to a single output pixel in the down-sampled image. The frequency sampling interval must be chosen very short based on Nyquist sampling theory in order to transform the entire data from input to output image, which is not feasible in most cases, and aliasing artifacts can be introduced.

As shown in FIG. 11, a conventional image size changing apparatus 1 includes a combination of the horizontal interpolator 2 and the vertical interpolator 5 for interpolating an input image signal SI in both the horizontal and vertical directions using the horizontal and vertical interpolation factors received from the horizontal interpolator factor generator 3 and the vertical interpolator factor generator 6, respectively. Using the horizontal size change rate received from the horizontal magnification storage 4 and the sync signal timed with the input image signal SI, the horizontal interpolator factor generator 3 produces three horizontal interpolation factors hw1, hw2, and hw3, each having a ratio between a horizontal component of the visual area determined by image data of an original image and a horizontal component of the visual area determined by image data of its size-changed image. The horizontal interpolation factors hw1, hw2, and hw3 are timed with a clock signal of which the frequency is two times greater than the pixel clock signal of the input image signal SI. Also produced by the horizontal interpolator factor generator 3 is a horizontal pixel enable signal indicative of effective ones of the pixel data from the horizontal interpolator 2 to be received by the vertical interpolator 5 and a read/write controller 9. Using the vertical size change rate received from the vertical magnification storage 7 and the syn signal timed with the input image signal SI, the vertical interpolator factor generator 6 produces three vertical interpolation factors vw1, vw2, and vw3, each having a ratio between a vertical component of the visual area determined by image data of an original image and a vertical component of the visual area determined by image data of its size-changed image. The vertical interpolation factors vw1, vw2, and vw3 are timed with the horizontal sync signal of the input image signal SI. Also produced by the vertical interpolator factor generator 6 is a vertical pixel enable signal indicative of effective ones of the pixel data from the vertical interpolator 5 to be received by the read/write controller 9. The read/write controller 9 is responsive to the horizontal pixel enable signal from the horizontal interpolator factor generator 3, the vertical pixel enable signal from the vertical interpolator factor generator 6, and the sync signal of the input image SI for controlling the writing of the pixel data received from the vertical interpolator 5 into the field memory 8. Each interpolator may comprise a group of latch circuits for delaying the input image signal by one pixel period or line memories for delaying the input image signal by one horizontal period, multipliers, and an adder.

BRIEF DESCRIPTION OF THE DRAWINGS

Preferred embodiments according to the present invention will now be described with reference to the Figures, in which like reference numerals denote like elements.

DETAILED DESCRIPTION OF EXEMPLARY EMBODIMENTS

The present invention may be understood more readily by reference to the following detailed description of certain embodiments of the invention.

The present invention provides an effective process of video image rescaling. This process uses a controllable interpolation kernel to generate the interpolated outputs ranging from relatively sharp at one end to relatively soft at the other end. The levels of sharpness and overshoot can be either selected by users using a set of control parameters or adaptively steered by the image contents. In addition, a downscaling process with anti-aliasing low pass filtering is used to generate the downsampled images without aliasing artifacts.

The present invention provides a system for video image rescaling using a controllable interpolation kernel. The system comprises a global and local sharpness control functionality to generate the interpolated images with the visual qualities ranging from relative sharpness to softness. Furthermore, the system comprises an overshoot control functionality to adjust the levels of overshoot/undershoot effects along the edges in the interpolated images. In addition, a set of anti-aliasing low pass filters are designed and conducted according to a certain range of downscaling factors.

Figure 1:
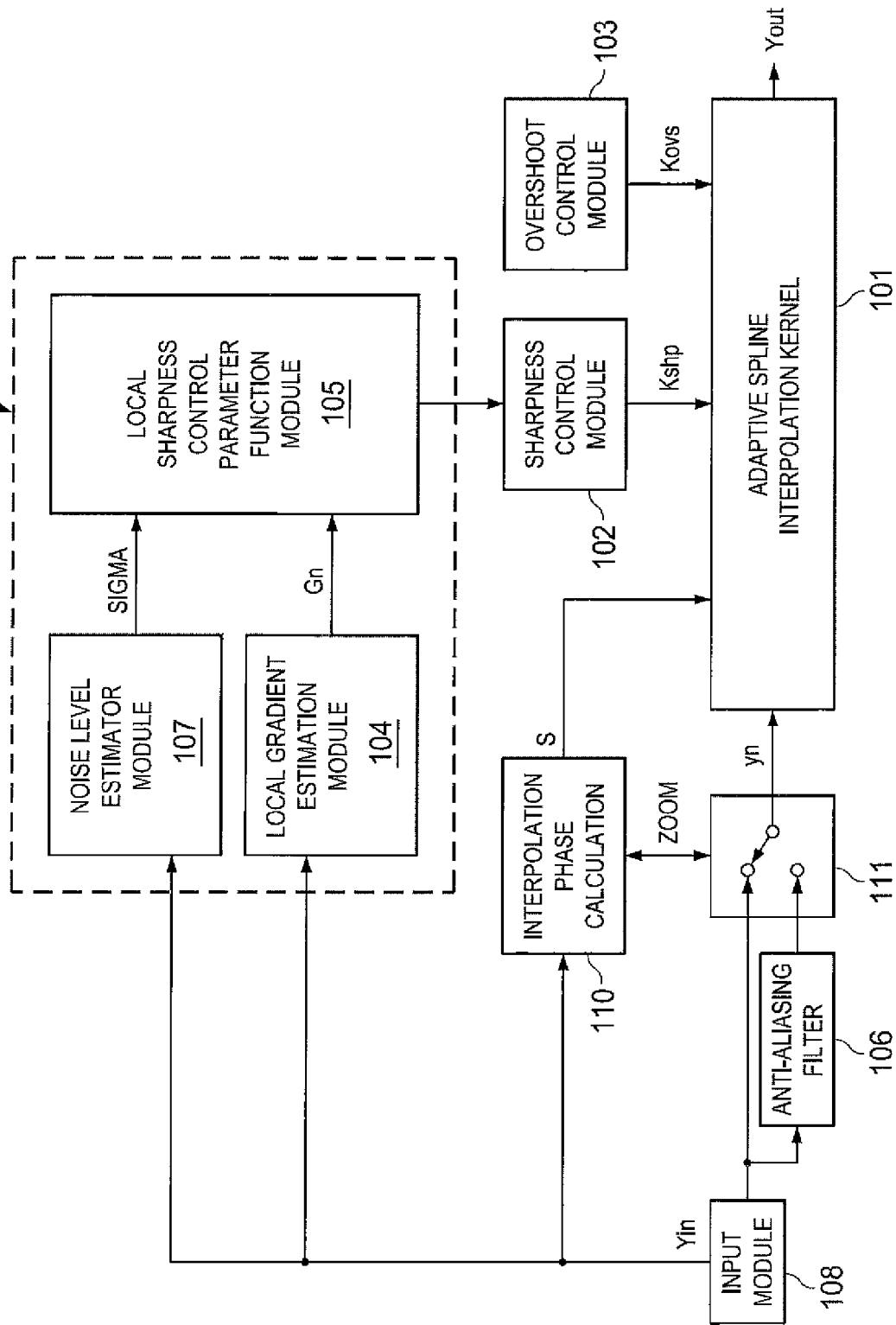
FIG. 1 illustrates a block diagram of a digital video rescaling system in accordance with one embodiment of the present invention.

Now referring to FIG. 1, the rescaling system comprises an adaptive spline interpolation kernel 101, a sharpness control module 102, an overshoot control module 103, a local sharpness control module 109, an anti-aliasing filter 106, and an input module 108. The adaptive spline interpolation kernel 101 is coupled to the input module 108 to receive input image data and generate interpolated pixels. The sharpness control module 102 and overshoot control module 103 are configured to generate control parameters for the adaptive spline interpolation kernel 101 to improve the sharpness, and reduce overshoot/undershoot artifacts in edge areas of the image. The local sharpness control module 109 is provided to make the sharpness control module 102 adaptive to the local image content. In addition, the anti-aliasing filter 106 is coupled between the input module 108 and the adaptive spline interpolation kernel 101, wherein the anti-aliasing filter 106 comprises a set of low pass filters to reduce aliasing artifacts during image downscaling. The interpolation phase calculation 110 is used to calculate the phase value (S) of the pixel to be interpolated in the interpolation processing.

Figure 2:
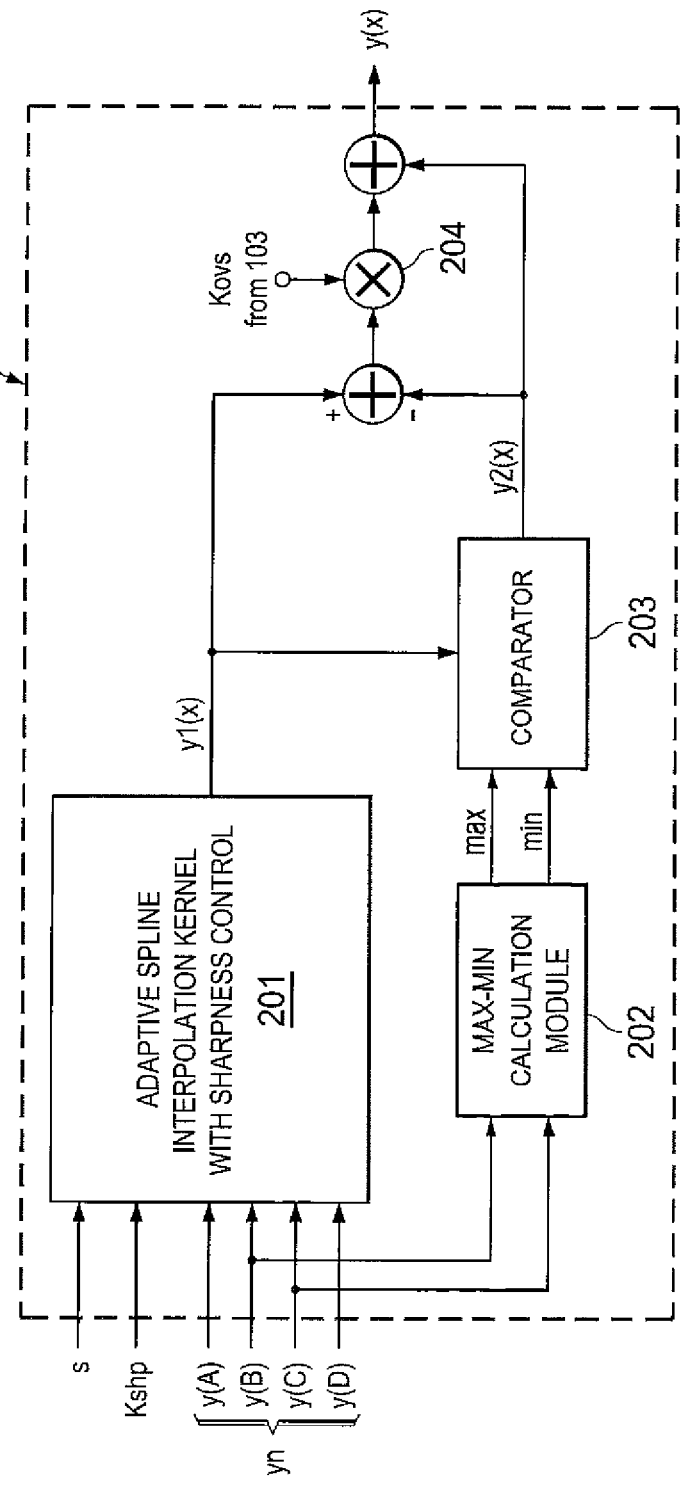
FIG. 2 illustrates a block diagram of the adaptive spline interpolation kernel in accordance with one embodiment of the present invention.
Figure 3:
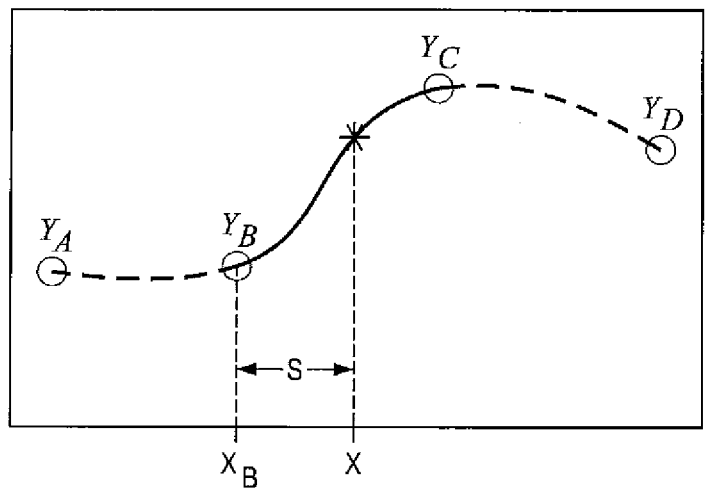
FIG. 3 illustrates the spline interpolation using four support pixels.

The adaptive spline interpolation kernel 101 uses a controllable third order polynomial function based on four input support pixels received from the input image data to generate an interpolated pixel. One embodiment of the implementation of the adaptive spline interpolation kernel 101 is shown in FIG. 2, wherein the adaptive spline interpolation kernel 101 calculates the interpolated pixel $y_1(x)$ using a third order polynomial function with sharpness control parameter Kshp. The calculation is performed according to the following Equation 1:

$$y_1(x) = \sum_{n=A,B,C,D} y_n * f_n(s, Kshp), \qquad \text{[Eqn. 1]}$$

where $y_A$, $y_B$, $y_C$ and $y_D$ are four support pixels from input image data; s is the distance from interpolation position to the position of the support pixel $y_b$ as shown in FIG. 3; and $f_n(s,Kshp)$ (n=A, B, C, D) are four control synthesis functions which can be expressed by the following Equations 2-5:

$$f_A(s,Kshp)=Kshp*(-s^3+2*s^2-s)/2, \qquad \text{[Eqn. 2]}$$

$$f_B(s,Kshp)=(3*Kshp*s^3-5*Kshp*s^2+2*(Kshp-1)*s+2)/2, \qquad \text{[Eqn. 3]}$$

$$f_C(s,Kshp)=(-3*Kshp*s^3+4*Kshp*s^2+(2-Kshp)*s)/2, \qquad \text{[Eqn. 4] and}$$

$$f_D(s,Kshp)=Kshp*(s^3-s^2)/2. \qquad \text{[Eqn. 5]}$$

Figure 4:
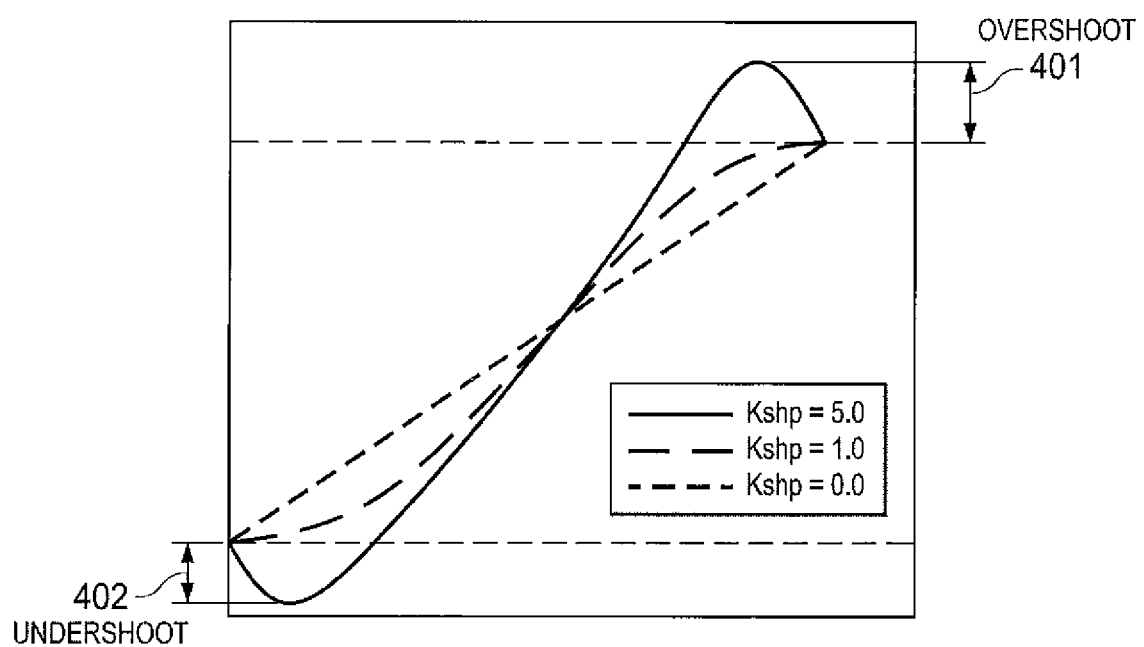
FIG. 4 illustrates the interpolation curves with different sharpness control parameter values.

Kshp is the global sharpness control parameter generated from the sharpness control module 102, wherein Kshp is used to adjust the sharpness of the rescaled image. Kshp has a predetermined range of negative to positive values to control the visual quality of the rescaled images from soft to sharp, wherein a negative Kshp produces a softer rescaled image and a positive Kshp produces a sharper rescaled image. FIG. 4 illustrates some examples of the interpolation curves driven by different values of the global sharpness control parameter Kshp, wherein the values of Kshp are set at 0.0, 1.0 and 5.0. A larger Kshp value (e.g., Kshp=5.0) produces a steeper interpolation curve as compared to a smaller Kshp value (e.g, Kshp=1.0), and the steeper interpolation curve gives a sharper rescaled image. Therefore, the setting of Kshp value can effectively control the sharpness of the interpolation curve. The value of Kshp can be determined by the user of the system or by the micro-controller (not shown) in the system.

From FIG. 4, it can be observed that large values of Kshp produce overshoot 401 and undershoot 402 effects. Strong overshoot and undershoot effects might result in an artificial-looking rescaled image. Hence, an overshoot/undershoot control parameter Kovs is provided to control the overshoot and undershoot effects.

Referring back to FIG. 2, the adaptive spline interpolation kernel 101 comprises a max-min calculation module 202, a comparator 203, and a multiplier 204. The max-min calculation module 202 is used to calculate the maximum value and the minimum value of the support pixels $y_B$ and $y_C$. The outputs of the max-min calculation module 202 are then compared with the output $y_1(x)$ of the kernel 201 in comparator 203 to generate the output $y_2(x)$ according to the following Equation 6:

$$y_2(x) = \begin{cases} \max(y_B, y_C) & \text{if } (y_1(x) > \max(y_B, y_C)) \\ \min(y_B, y_C) & \text{if } (y_1(x) < \min(y_B, y_C)) \\ y_1(x) & \text{else.} \end{cases} \quad [\text{Eqn. 6}]$$

The outputs $y_1(x)$ and $y_2(x)$ are then subtracted to produce an output $(y_1(x)-y_2(x))$. The multiplier 204 multiplies the output $(y_1(x)-y_2(x))$ by the overshoot control parameter Kovs to produce the output $Kovs*(y_1(x)-y_2(x))$. Thereafter, $Kovs*(y_1(x)-y_2(x))$ is added to $y_2(x)$ to generate the final output $y(x)$ with sharpness and overshoot control according to the following Equation 7:

$$y(x)=Kovs*(y_1(x)-y_2(x))+y_2(x). \quad [\text{Eqn. 7}]$$

Figure 5:
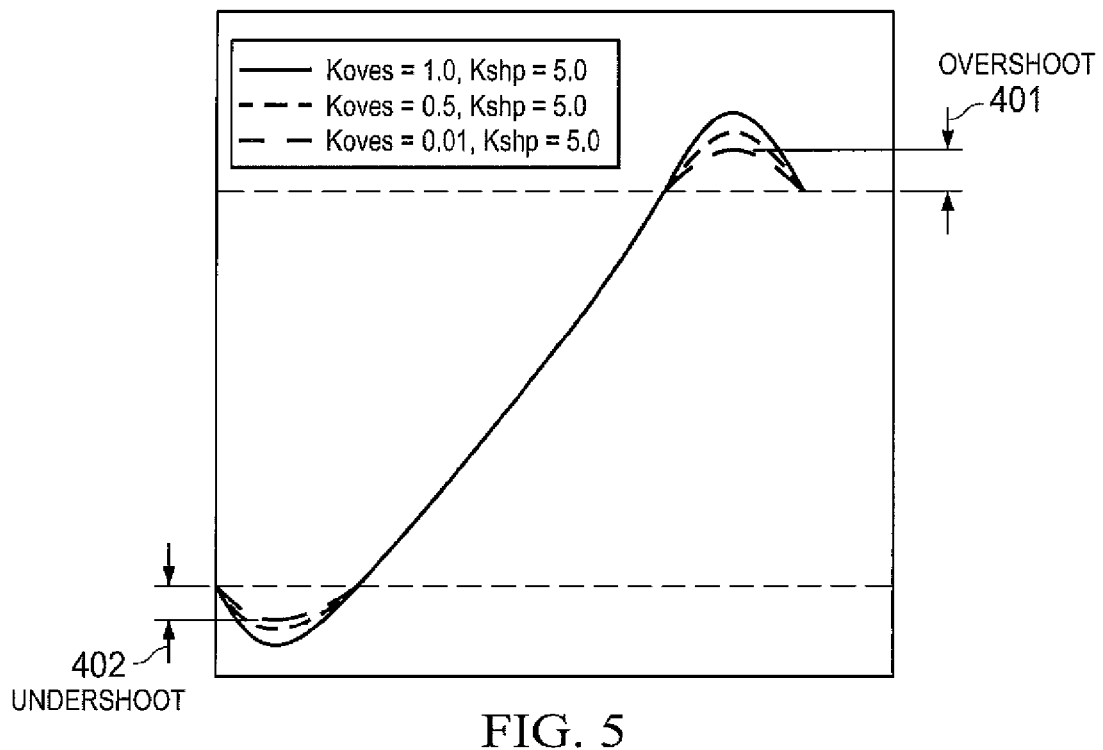
FIG. 5 illustrates the interpolation curves with different overshoot control parameter values.

FIG. 5 illustrates some examples of the interpolation curves having the same Kshp=5.0 but driven by different values of Kovs, wherein the values of Kovs are set at 0.01, 0.5 and 1.0. A smaller Kovs value (e.g., Kovs=0.01) creates a larger reduction of the overshoot 401 and undershoot 402 effects. Therefore, the setting of the Kovs value can effectively control the overshoot and undershoot of the interpolation curve, thereby allowing the rescaling system to produce a more natural-looking image.

Figure 6:
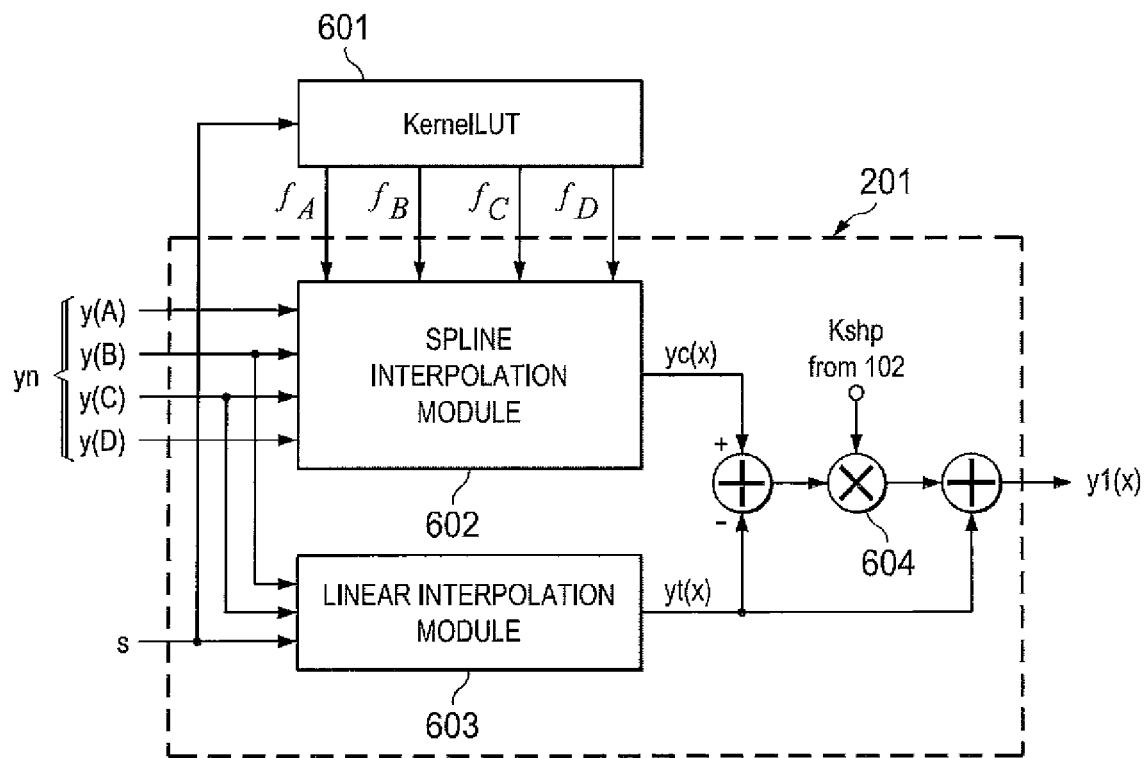
FIG. 6 illustrates a block diagram of the adaptive spline interpolation kernel in accordance with one alternative embodiment of the present invention.

An alternative embodiment of the adaptive spline interpolation kernel with sharpness control 201 is shown in FIG. 6, wherein the adaptive spline interpolation kernel with sharpness control 201 comprises a kernel look up table (KernelLUT) 601, a spline interpolation module 602, and a linear interpolation module 603. The adaptive spline interpolation kernel with sharpness control 201 uses the KernelLUT 601 to reduce the complexity of the interpolation process. KernelLUT 601 is a look up table which stores the values of four control synthesis functions. The contents of a look up table can be calculated by the following Equations 8-11:

$$f_A(s)=(-s^3+2*s^2-s)/2, \quad [\text{Eqn. 8}]$$

$$f_B(s)=(3*s^3-5*s^2+2)/2, \quad [\text{Eqn. 9}]$$

$$f_C=(-3*s^3+4*s^2+s)/2, \text{ and} \quad [\text{Eqn. 10}]$$

$$f_D(s)=(s^3-s^2)/2. \quad [\text{Eqn. 11}]$$

The size of this look up table is dependent on the resolution of interpolation, which is initialized at the beginning of the rescaling process. The spline interpolation module 602 is used to calculate the interpolated pixel value $y_c(X)$ using the KernelLUT 601. The interpolation can be obtained according to the following Equation 12:

$$y_c(x)=y(A)*f_A(s)+y(B)*f_B(s)+y(C)*f_C(s)+y(D)*f_D(s). \quad [\text{Eqn. 12}]$$

The linear interpolation 603 is used to calculate the interpolated pixel value $y_t(x)$ which can be obtained according to the following Equation 13:

$$y_t(x)=(1-s)*y(B)+s*y(C). \quad [\text{Eqn. 13}]$$

The outputs $y_c$ and $y_t(x)$ are then subtracted to produce an output $(y_c(x)-y_t(x))$. The multiplier 604 multiplies the output $(y_c(x)-y_t(x))$ by the sharpness control parameter Kshp to produce the output $Kshp*(y_c(x)-y_t(x))$. Thereafter, $Kshp*(y_c(x)-y_t(x))$ is added to $y_t(x)$ to generate the final output $y_1(x)$ with sharpness control according to the following Equation 14:

$$y_1(x)=Kshp*(y_c(x)-y_t(x))+y_t(x). \quad [\text{Eqn. 14}]$$

Referring back to FIG. 1, the rescaling system comprises a local sharpness control module 109 to make the sharpness control module 102 adaptive to the local image content. Generally, the sharpness control is applied according to the local gradient magnitude (Gn) and the noise level (Sigma) estimated from the digital picture or video sequence. The local sharpness control module 109 comprises a local gradient estimation module 104, a noise level estimator module 107, and a local sharpness control parameter function module 105.

Figure 7:
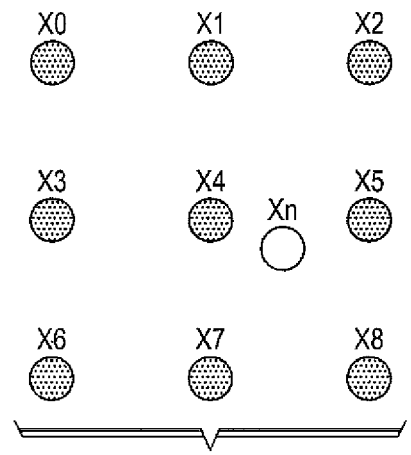
FIG. 7 illustrates neighbourhood pixels for local gradient estimation.

The local gradient estimation module 104 is coupled to the input module 108 to estimate the local gradient magnitude Gn based on a 3×3 neighbourhood window (shown in FIG. 7) from the input image data. The local gradient estimation module 104 calculates the local gradient magnitude Gn according to the following Equation 15:

$$G_n=(abs(X0+2*X1+X2-(X6+2*X7+X8))+abs(X0+2*X3+X6-(X2+2*X5+X8)))/8. \quad [\text{Eqn. 15}]$$

The noise level estimator module 107 is coupled to the input module 108 to estimate the noise level Sigma from the input image or video. An example of a suitable noise level estimator or detector is disclosed in U.S. Pat. No. 5,657,401, the content of which is incorporated herein by reference. Alternatively, the noise level can be predetermined before transmitting it to the system so as to simplify the implementation of the system.

Figure 8:
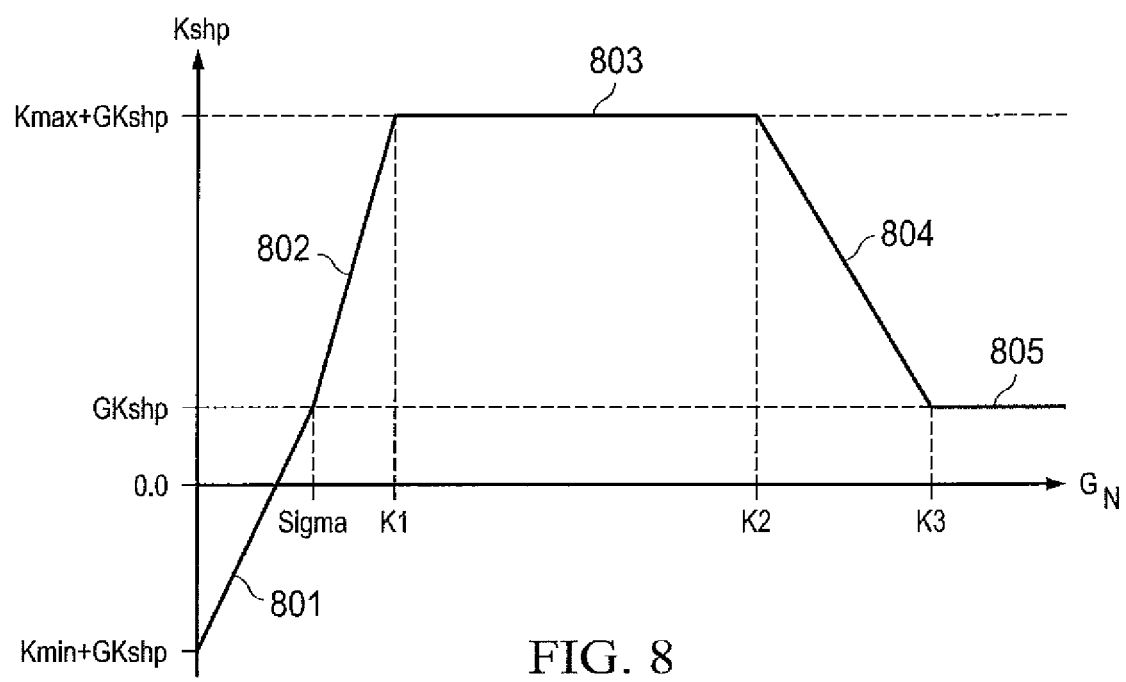
FIG. 8 illustrates the graphical relationship between the local sharpness control parameter and local gradient values.

The local gradient estimation module 104 and the noise level estimator module 107 are both coupled to the local sharpness control parameter function module 105, wherein the local gradient estimation module 104 transmits the local gradient magnitude Gn to the local sharpness control parameter function module 105, and wherein the noise level estimator module 107 transmits the noise level Sigma to the local sharpness control parameter function module 105. The local sharpness control parameter function module 105 is configured to control the sharpness control module 102 using a transfer function, wherein the transfer function indicates the relationship between the control parameter Kshp and the local image content. FIG. 8 illustrates an example of the transfer function Kshp(Gn), wherein the transfer function Kshp(Gn) can be defined according to the following Equation 16:

$$Kshp(Gn) = AKshp(Gn) + GKshp. \quad [\text{Eqn. 16}]$$

GKshp is a fixed value that is defined by the global sharpness control parameter Kshp. AKshp(Gn) is a variable value that is defined by the control parameters max K, min K, K1, K2, K3, and Sigma. The AKshp(Gn) can be expressed by a transfer function according to the following Equation 17:

$$AKshp(G_n) = \begin{cases} \dfrac{|minK| * G_n}{Sigma} + minK & \text{if } (G_n \leq Sigma) \\ \dfrac{maxK * (G_n - Sigma)}{K1 - Sigma} & \text{if } (Sigma < G_n \leq K1) \\ maxK & \text{if } (K1 < G_n \leq K2) \\ \dfrac{maxK * (K3 - G_n)}{K3 - K2} & \text{if } (K2 < G_n \leq K3) \\ 0 & \text{else.} \end{cases} \quad [\text{Eqn. 17}]$$

When the local gradient magnitude value (Gn) is lower than the noise level Sigma, the pixels are considered as being corrupted by noise. In this case, the sharpness control value will be lower than GKshp and decreases linearly to a minimum value (min K+GKshp), as illustrated by segment 801 in FIG. 8. When Gn is between the range of Sigma and K1, the sharpness control value increases linearly to achieve the maximum value (max K+GKshp) as illustrated by segment 802. The sharpness control value is kept at the constant value (maxK+GKshp) until the Gn is larger than K2. The pixels with gradient magnitudes Gn falling in the segment 802 and segment 803 are considered as low and middle edges, respectively. Hence, higher sharpness control parameter values are used on these edge pixels. On the other hand, pixels with gradient magnitude Gn that is larger than K2 are considered as large edge pixels. The sharpness control parameter value then decreases linearly as shown by segment 804. For gradient magnitude Gn that is larger than K3, the sharpness control parameter value is kept constant at GKshp as shown by segment 805.

Referring back to FIG. 1, the rescaling system further comprises the anti-aliasing filter 106 to reduce any aliasing artifacts during image downscaling. In particular, the input image data is coupled to the anti-aliasing filter 106 via a switch device 111. The switch device 111 is configured to select or bypass the anti-aliasing filter 106 depending on the rescaling factor. Suppose the rescaling factor is more than 1, the switch device 111 would bypass the anti-aliasing filter 106. If the rescaling factor is less than 1, the switch device 111 would select the anti-aliasing filter 106. The anti-aliasing filter 106 then processes the input image data and sends a filtered image data to the adaptive spline interpolation kernel 101.

Figures 9, 10:
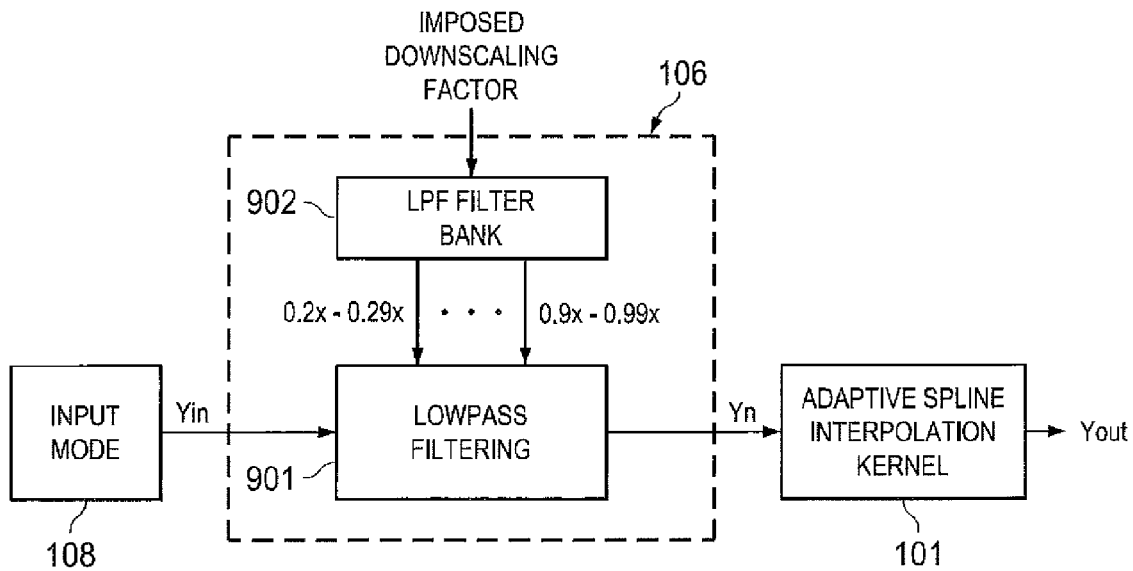
FIG. 9 illustrates a block diagram of the anti-aliasing filter in accordance with one embodiment of the present invention.
FIG. 10 illustrates the list of coefficients of eight anti-aliasing low pass 7-tap filters according to the predetermined range of downscaling factors.
Figure 11:
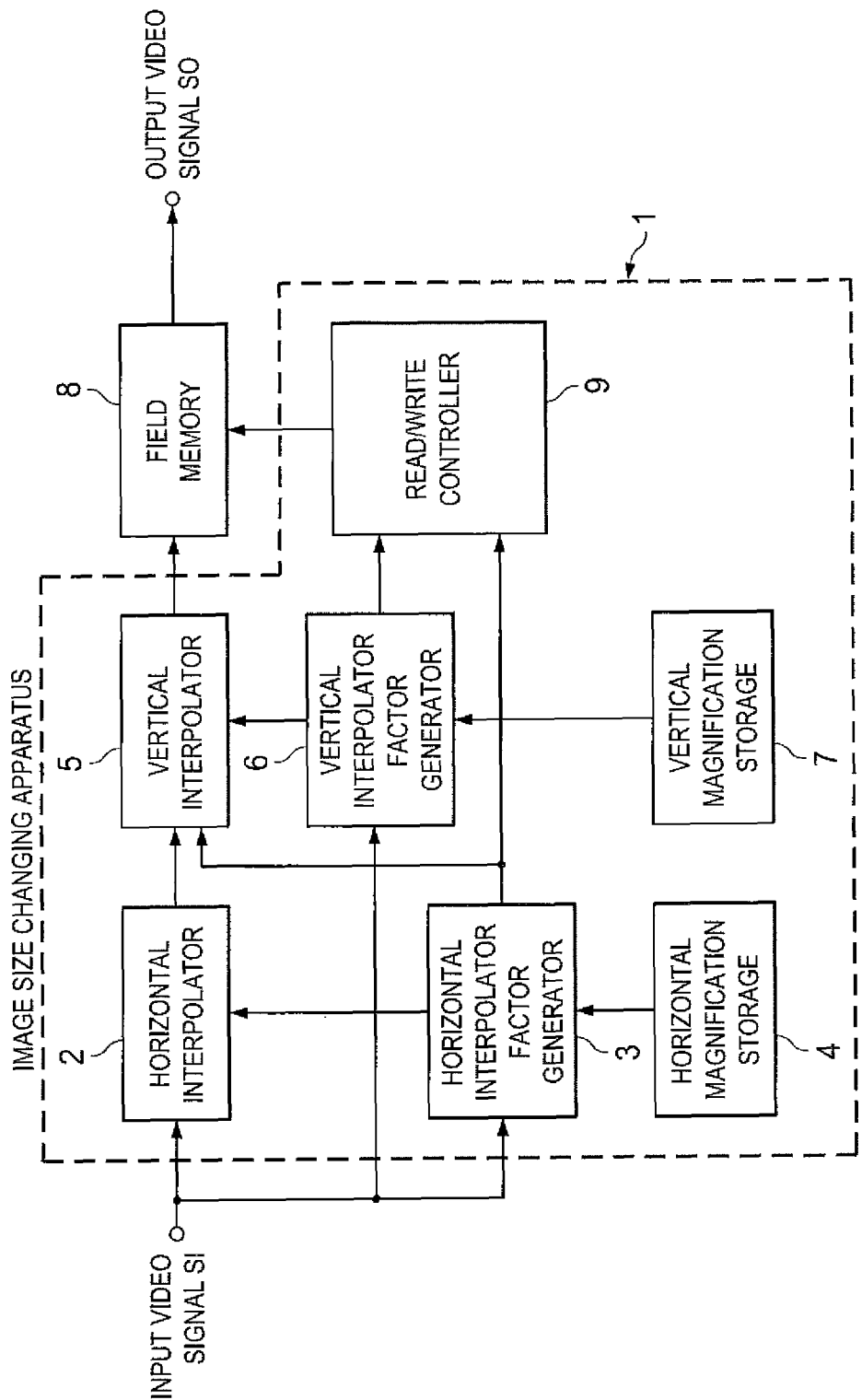
FIG. 11 shows a conventional image size changing apparatus.

The anti-aliasing filter 106 comprises a plurality of 1 D low pass filters that are activated according to a predetermined range of downscaling factors. FIG. 9 illustrates a block diagram of the anti-aliasing filter 106, which comprises a low pass filtering module 901 and a low pass filter bank 902. During downscaling, one set of filter coefficients, h(m), is selected from the low pass filter bank 902 according to the downscaling factor. The selected set of filter coefficients are then applied on the input image data in the low pass filtering module 901 to produce the filtered image data to the adaptive spline interpolation kernel 101 according to the following Equation 18:

$$y(n) = \sum_{i=n-m/2}^{n+m/2} h(i) * Yin(i) \quad [\text{Eqn. 18}]$$

where m is the length of the filter.

The low pass filter coefficients stored in the low pass filter bank 902 are designed using finite impulse response (FIR) filter design methods based on adjustable Hanning window. The cutoff frequencies used in the filter design depend on the downscaling factors. Therefore, different downscaling factors correspond to different low pass filters. In one embodiment, eight filters are operated according to eight pre-divided ranges of downscaling factors. FIG. 10 shows an example of eight sets of 7-tap low pass filter coefficients that are stored in the low pass filter bank 901. Furthermore, the effective range of the downscaling factors is 0.20 to 0.99.

While this detailed description has set forth some embodiments of the present invention, the appended claims are sufficiently supported to cover and will cover other embodiments of the present invention which differ from the described embodiments according to various modifications and improvements.

What is claimed is:
1. A digital video rescaling system, comprising:
    an input module configured to receive input image data;
    a noise level estimator configured to estimate a noise level within a portion of the received input image data;
    a local gradient estimator configured to estimate a local gradient magnitude based on the portion of the received input image data;
    an overshoot control configured to generate an artifact control parameter to reduce artifacts in edge areas of an image corresponding to the received input image data;
    an interpolation phase calculator configured to calculate a phase value of a pixel within the received input image data to be interpolated;
    an adaptive spline interpolation kernel coupled to the input module by the interpolation phase calculator and coupled to the overshoot control, wherein the adaptive spline interpolation kernel is configured to receive the phase value, the artifact control parameter, and a global sharpness control parameter and to generate an interpolated pixel by applying a function involving the global sharpness control parameter directly on a plurality of support pixels from the input image data; and
    a local sharpness control module configured to modify the global sharpness control parameter according to the estimated noise level and the estimated local gradient magnitude for the portion of the received input image data.
2. The digital video rescaling system of claim 1, wherein the adaptive spline interpolation kernel is configured to generate an interpolated pixel $y_1(x)$ based on the following equation:

$$y_1(x) = \sum_{n=A,B,C,D} y_n * f_n(s, Kshp),$$

wherein $y_A$, $y_B$, $y_C$ and $y_D$ are four support pixels from input image data, wherein s is a distance from interpolation position to a position of the support pixel $y_B$, wherein Kshp is the global sharpness control parameter, and wherein $f_n(s, Kshp)$ for n=A,B,C,D are four control synthesis functions which are expressed by the following equations:

$$f_A(s,Kshp)=Kshp*(-s^3+2s^2-s)/2;$$

$$f_B(s,Kshp)=(3*Kshp*s^3-5*Kshp*s^2+2*(Kshp-1)*s+2)/2;$$

$$f_C(s,Kshp)=(-3*Kshp*s^3+4*Kshp*s^2+2-Kshp*s)/2;$$

$$f_D(s,Kshp)=Kshp*(s^3-s^2)/2.$$

3. The digital video resealing system of claim 2, further comprising an overshoot control module coupled to the adaptive spline interpolation kernel, wherein the overshoot control module is configured to generate an overshoot control parameter to control the adaptive spline interpolation kernel, wherein the adaptive spline interpolation kernel comprises:

a max-min calculation unit configured to receive the data of pixels $y_B$ and $y_C$, and configured to calculate the maximum value and the minimum value of the support pixels $y_B$ and $y_C$;

a comparator coupled to the max-min calculation unit and adaptive spline interpolation kernel, wherein the comparator is configured to compare the maximum value and the minimum value of the support pixels $y_B$ and $y_C$ with the interpolated pixel $y_1(x)$ to generate an output $y_2(x)$ according the following equation:

$$y_2(x) = \begin{cases} \max(y_B, y_C) & \text{if } (y_1(x) > \max(y_B, y_C)) \\ \min(y_B, y_C) & \text{if } (y_1(x) < \min(y_B, y_C)) \\ y_1(x) & \text{else;} \end{cases}$$

a subtractor coupled to the max-min calculation unit and the comparator, configured to subtract the outputs $y_1(x)$ and $y_2(x)$, thereby generating an output $(y_1(x)-y_2(x))$; and a multiplier coupled to the subtractor, wherein the multiplier is configured to multiply the output $(y_1(x)-y_2(x))$ by the overshoot control parameter Kovs to generate an output $Kovs*(y_1(x)-y_2(x))$, and whereby the final output output $y(x)=Kovs*(y_1(x)-y_2(x))+y_2(x)$ is based on the addition of $y_2(x)$ to output $Kovs*(y_1(x)-y_2(x))$.

4. The digital video rescaling system of claim 1, wherein the local sharpness control module is configured to modify the global sharpness control parameter using a transfer function based on the local gradient magnitude and the noise level.

5. The digital video resealing system of claim 4, wherein the transfer function of the local sharpness control parameter function module can be expressed as:

$$Kshp(Gn)=AKshp(Gn)+GKshp,$$

wherein GKshp is a fixed value that is defined by a global sharpness control parameter Kshp, AKshp(Gn) is a variable value that is defined by control parameters max K, min K, K1, K2, K3, and Sigma, wherein Sigma is the noise level, wherein Gn is a local gradient magnitude; and wherein AKshp(Gn) is expressed by a transfer function according to the following equation:

$$AKshp(Gn) = \begin{cases} \dfrac{|\min K|*Gn}{\text{Sigma}} + \min K & \text{if } (Gn \leq \text{Sigma}) \\ \dfrac{\max K*(Gn-\text{Sigma})}{K1-\text{Sigma}} & \text{if } (\text{Sigma} < Gn \leq K1) \\ \max K & \text{if } (K1 < Gn \leq K2) \\ \dfrac{\max K*(K3-Gn)}{K3-K2} & \text{if } (K2 < Gn \leq K3) \\ 0 & \text{else.} \end{cases}$$

6. The digital video resealing system of claim 1, further comprising an anti-aliasing filter coupled between the input module and the adaptive spline interpolation kernel, wherein the anti-aliasing filter comprises a set of low pass filters that are configured to reduce aliasing artifacts during image downscaling.

7. The digital video rescaling system of claim 6, further comprising a switch device coupled between the input module and the anti-aliasing filter, wherein the switch device is configured to activate the anti-aliasing filter during downscaling, and wherein the switch device is configured to deactivate the anti-aliasing filter during upscaling.

8. A method of rescaling video images, comprising:
receiving data corresponding to an input image;
estimating a noise level within a portion of the received input image data and a local gradient magnitude based on the portion of the received input image data;
generating an artifact control parameter to reduce artifacts in edge areas of an image corresponding to the received input image data;
calculating a phase value of a pixel within the received input image data to be interpolated;
modifying a global sharpness control parameter according to the estimated noise level and the estimated local gradient magnitude for the portion of the received input image data; and
calculating interpolated pixel values based on the phase value and the artifact control parameter and by applying a function involving the global sharpness control parameter directly on the input image data by using an adaptive spline interpolation kernel.

9. The method of claim 8, wherein the adaptive spline interpolation kernel is configured to generate an interpolated pixel $y_1(x)$ based on the following equation:

$$y_1(x) = \sum_{n=A,B,C,D} y_n * f_n(s, Kshp),$$

wherein $y_A$, $y_B$, $y_C$ and $y_D$ are four support pixels from input image data, wherein s is a distance from interpolation position to a position of the support pixel $y_B$, wherein Kshp is the global sharpness control parameter, and wherein $f_n(s,Kshp)$ for n=A,B,C,D are four control synthesis functions which are expressed by the following equations:

$$f_A(s,Kshp)=Kshp*(-s^3+2s^2-s)/2;$$

$$f_B(s,Kshp)=(3*Kshp*s^3-5*Kshp*s^2+2*(Kshp-1)*s+2)/2;$$

$$f_C(s,Kshp)=(-3*Kshp*s^3+4*Kshp*s^2+2-Kshp*s)/2;$$

$$f_D(s,Kshp)=Kshp*(s^3-s^2)/2.$$

10. The method of claim 9, wherein calculating interpolated pixel values comprises:
   calculating a maximum value and a minimum value of the support pixels $y_B$ and $y_C$;
   comparing the maximum value and the minimum value of the support pixels $y_B$ and $y_C$ with the interpolated pixel $y_1(x)$ to generate an output $y_2(x)$ according the following equation:

$$y_2(x) = \begin{cases} \max(y_B, y_C) & \text{if } (y_1(x) > \max(y_B, y_C)) \\ \min(y_B, y_C) & \text{if } (y_1(x) < \min(y_B, y_C)) \\ y_1(x) & \text{else;} \end{cases}$$

subtracting the outputs $y_1(x)$ and $y_2(x)$ to generate an output $(y_1(x)-y_2(x))$;
   multiplying the output $(y_1(x)-y_2(x))$ by the overshoot control parameter Kovs to generate an output Kovs*$(y_1(x)-y_2(x))$; and
   generating the final output $y(x)$=Kovs*$(y_1(x)-y_2(x))+y_2(x)$ by adding $y_2(x)$ to output Kovs*$(y_1(x)-y_2(x))$.

11. The method of claim 8, further comprising modifying the global sharpness control parameter by using a transfer function based on the local gradient magnitude and the noise level.

12. The method of claim 11, wherein the transfer function can be expressed as:

$Kshp(Gn)=AKshp(Gn)+GKshp$, wherein GKshp is a fixed value that is defined by a global sharpness control parameter Kshp, AKshp(Gn) is a variable value that is defined by control parameters max K, min K, K1, K2, K3, and Sigma, wherein Sigma is the noise level, wherein Gn is a local gradient magnitude, and
   wherein AKshp(Gn) is expressed by a transfer function according to the following equation:

$$AKshp(Gn) = \begin{cases} \frac{|\min K| * Gn}{\text{Sigma}} + \min K & \text{if } (Gn \leq \text{Sigma}) \\ \frac{\max K * (Gn - \text{Sigma})}{K1 - \text{Sigma}} & \text{if } (\text{Sigma} < Gn \leq K1) \\ \max K & \text{if } (K1 < Gn \leq K2) \\ \frac{\max K * (K3 - Gn)}{K3 - K2} & \text{if } (K2 < Gn \leq K3) \\ 0 & \text{else.} \end{cases}$$

13. The method of claim 8, further comprising:
   selecting a set of filter coefficients from a low pass filter bank according to a downscaling factor; and
   applying the set of filter coefficients on the input image data to reduce anti-aliasing effects during downscaling.

14. A chip comprising a computer executable medium embedded therein computer executable instructions for rescaling video images, wherein the instructions comprise instructions for:
   receiving data corresponding to an input image;
   estimating a noise level within a portion of the received input image data and a local gradient magnitude based on the portion of the received input image data;
   generating an artifact control parameter to reduce artifacts in edge areas of an image corresponding to the received input image data;
   calculating a phase value of a pixel within the received input image data to be interpolated;
   modifying a global sharpness control parameter according to the estimated noise level and the estimated local gradient magnitude for the portion of the received input image data; and
   calculating interpolated pixel values based on the phase value and the artifact control parameter and by applying a function involving the global sharpness control parameter directly on the input image data by using an adaptive spline interpolation kernel.

15. The chip of claim 14, wherein the adaptive spline interpolation kernel is configured to generate an interpolated pixel $y_1(x)$ based on the following equation:

$$y_1(x) = \sum_{n=A,B,C,D} y_n * f_n(s, Kshp),$$

wherein $y_A$, $y_B$, $y_C$ and $y_D$ are four support pixels from input image data, wherein s is a distance from interpolation position to a position of the support pixel $y_B$, wherein Kshp is the global sharpness control parameter, and wherein $f_n(s,Kshp)$ for n=A,B,C,D are four control synthesis functions which are expressed by the following equations:

$f_A(s,Kshp)=Kshp*(-s^3+2s^2-s)/2$;

$f_B(s,Kshp)=(3*Kshp*s^3-5*Kshp*s^2+2*(Kshp-1)*s+2)/2$;

$f_C(s,Kshp)=(-3*Kshp*s^3+4*Kshp*s^2+2-Kshp*s)/2$;

$f_D(s,Kshp)=Kshp*(s^3-s^2)/2$.

16. The chip of claim 15, wherein calculating interpolated pixel values comprises:
   calculating a maximum value and a minimum value of the support pixels $y_B$ and $y_C$;
   comparing the maximum value and the minimum value of the support pixels $y_B$ and $y_C$ with the interpolated pixel $y_1(x)$ to generate an output $y_2(x)$ according the following equation:

$$y_2(x) = \begin{cases} \max(y_B, y_C) & \text{if } (y_1(x) > \max(y_B, y_C)) \\ \min(y_B, y_C) & \text{if } (y_1(x) < \min(y_B, y_C)) \\ y_1(x) & \text{else;} \end{cases}$$

subtracting the outputs $y_1(x)$ and $y_2(x)$ to generate an output $(y_1(x)-y_2(x))$;
   multiplying the output $(y_1(x)-y_2(x))$ by an overshoot control parameter Kovs to generate an output Kovs*$(y_1(x)-y_2(x))$; and
   generating the final output $y(x)$=Kovs*$(y_1(x)-y_2(x))+y_2(x)$ by adding $y_2(x)$ to output Kovs*$(y_1(x)-y_2(x))$.

17. The chip of claim 14, wherein modifying the global sharpness control parameter comprises: modifying the global sharpness control parameter by using a transfer function based on the local gradient magnitude and the noise level.

18. The chip of claim 17, wherein the transfer function can be expressed as:

$Kshp(Gn)=AKshp(Gn)+GKshp$, wherein GKshp is a fixed value that is defined by a global sharpness control parameter Kshp, AKshp(Gn) is a variable value that is defined by control parameters max K, min K, K1, K2, K3, and Sigma, wherein Sigma is the noise level, wherein Gn is a local gradient magnitude, and wherein AKshp(Gn) is expressed by a transfer function according to the following equation:

$$AKshp(Gn) = \begin{cases} \frac{|minK| * Gn}{Sigma} + minK & \text{if } (Gn \leq Sigma) \\ \frac{maxK * (Gn - Sigma)}{K1 - Sigma} & \text{if } (Sigma < Gn \leq K1) \\ maxK & \text{if } (K1 < Gn \leq K2) \\ \frac{maxK * (K3 - Gn)}{K3 - K2} & \text{if } (K2 < Gn \leq K3) \\ 0 & \text{else.} \end{cases}$$

19. The chip of claim 14, wherein the instructions further comprise instructions for:
 selecting a set of filter coefficients from a low pass filter bank according to a downscaling factor; and
 applying the set of filter coefficients on the input image data to reduce anti-aliasing effects during downscaling.

20. The chip of claim 19, wherein the instructions further comprise instructions for:
 deactivating the set of filter coefficients on the input image data during upscaling.

\* \* \* \* \*

UNITED STATES PATENT AND TRADEMARK OFFICE
CERTIFICATE OF CORRECTION

PATENT NO. : 8,587,726 B2
APPLICATION NO. : 12/655254
DATED : November 19, 2013
INVENTOR(S) : Huang et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 567 days.

Signed and Sealed this
Twentieth Day of October, 2015

Michelle K. Lee
*Director of the United States Patent and Trademark Office*